US007285165B2

(12) United States Patent
Caveny et al.

(10) Patent No.: US 7,285,165 B2
(45) Date of Patent: Oct. 23, 2007

(54) CEMENT COMPOSITIONS COMPRISING SET RETARDER COMPOSITIONS AND ASSOCIATED METHODS

(75) Inventors: William J. Caveny, Rush Springs, OK (US); Rickey L. Morgan, Duncan, OK (US); Ronney R. Koch, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/100,757

(22) Filed: Apr. 7, 2005

(65) Prior Publication Data

US 2005/0178295 A1    Aug. 18, 2005

Related U.S. Application Data

(60) Division of application No. 10/891,384, filed on Jul. 14, 2004, now Pat. No. 7,021,380, which is a continuation-in-part of application No. 10/608,748, filed on Jun. 27, 2003, now Pat. No. 7,073,585.

(51) Int. Cl.
C04B 24/12 (2006.01)
C04B 24/16 (2006.01)
C04B 22/00 (2006.01)

(52) U.S. Cl. .................. 106/724; 106/726; 106/727; 106/733; 106/819; 106/823

(58) Field of Classification Search ............... 106/724, 106/726, 727, 819, 823
See application file for complete search history.

(56) References Cited

U.S. PATENT DOCUMENTS

| | | | |
|---|---|---|---|
| 3,132,693 A | 5/1964 | Weisend .................. 166/33 |
| 3,359,225 A | 12/1967 | Weisend .................. 260/29.6 |
| 3,936,408 A | 2/1976 | Adams et al. ............ 260/42.13 |
| 3,956,140 A | 5/1976 | Nahm et al. |
| 3,994,852 A | 11/1976 | Adams et al. |
| 4,011,909 A | 3/1977 | Adams et al. ............ 166/293 |
| 4,015,991 A | 4/1977 | Persinski et al. ........ 106/90 |
| 4,022,731 A | 5/1977 | Schmitt .................. 260/29.6 E |
| 4,107,057 A | 8/1978 | Dill et al. ............... 252/8.55 C |
| 4,149,900 A | 4/1979 | Childs et al. ............ 106/314 |
| 4,340,525 A | 7/1982 | Hubner et al. .......... 252/8.55 B |
| 4,367,093 A | 1/1983 | Burkhalter et al. |
| 4,433,731 A | 2/1984 | Chatterji et al. ........ 166/293 |
| 4,435,216 A | 3/1984 | Diehl et al. ............. 106/97 |
| 4,466,837 A | 8/1984 | Chatterji et al. ........ 106/85 |
| 4,482,379 A | 11/1984 | Dibrell et al. ........... 106/76 |
| 4,515,635 A | 5/1985 | Rao et al. ................ 106/90 |
| 4,554,081 A | 11/1985 | Borchardt et al. ....... 252/8.5 A |
| 4,555,269 A | 11/1985 | Rao et al. ................ 106/90 |
| 4,557,763 A | 12/1985 | George et al. ........... 106/90 |
| 4,622,373 A | 11/1986 | Bardoliwalla .......... 526/240 |
| 4,632,186 A | 12/1986 | Boncan et al. .......... 166/293 |
| 4,640,942 A | 2/1987 | Brothers .................. 523/130 |
| 4,657,948 A | 4/1987 | Roark et al. ............. 523/130 |
| 4,674,574 A | 6/1987 | Savoly et al. ........... 166/293 |
| 4,676,317 A * | 6/1987 | Fry et al. ................ 166/293 |
| 4,687,516 A | 8/1987 | Burkhalter et al. ..... 106/90 |
| 4,699,225 A | 10/1987 | Bardoliwalla ........... 175/72 |
| 4,700,780 A | 10/1987 | Brothers .................. 166/293 |
| 4,703,801 A | 11/1987 | Fry et al. ................ 166/293 |
| 4,742,094 A | 5/1988 | Brothers et al. ......... 523/130 |
| 4,791,989 A | 12/1988 | Brothers et al. ......... 166/293 |
| 4,806,164 A | 2/1989 | Brothers .................. 106/90 |
| 4,818,288 A | 4/1989 | Aignesberger et al. .. 106/90 |
| 4,883,125 A | 11/1989 | Wilson et al. |
| 4,888,120 A | 12/1989 | Mueller et al. ......... 252/8.551 |
| 4,931,489 A | 6/1990 | Kucera et al. .......... 523/130 |
| 4,938,803 A | 7/1990 | Huddleston et al. .... 106/719 |
| 4,941,536 A * | 7/1990 | Brothers et al. ......... 166/293 |
| 5,028,271 A | 7/1991 | Huddleston et al. .... 106/720 |
| 5,028,341 A | 7/1991 | Liao ....................... 252/8.512 |
| 5,049,288 A | 9/1991 | Brothers et al. ........ 252/8.551 |
| 5,076,852 A | 12/1991 | Bloys et al. |
| 5,092,935 A | 3/1992 | Crema et al. ........... 106/808 |
| 5,110,853 A | 5/1992 | Van-Det et al. ........ 524/375 |
| 5,116,421 A | 5/1992 | Ganguli .................. 106/823 |
| 5,134,215 A | 7/1992 | Huddleston et al. .... 527/400 |
| 5,147,964 A | 9/1992 | Huddleston et al. .... 527/400 |

(Continued)

FOREIGN PATENT DOCUMENTS

EP    0 157 055 A2    10/1985

(Continued)

OTHER PUBLICATIONS

Answer 2 of 19 CHEMICAL Abstracts STN□□ZA 9609195 (Aug. 14, 1997) Ysbrandy et al. Abstract only.*
Answer 17 of 19 Chemical Abstracts STN□□FR 1524000 (May 3, 1968) Moscow Automotive Transportation Institute. Abstract only.*
Foreign communication from a related counterpart application dated Nov. 22, 2005.
Foreign communication from a related counterpart application dated Dec. 14, 2005.
Halliburton brochure entitled "Halad®-9 Fluid-Loss Additive" dated 1999.
Halliburton brochure entitled "Halad®-14 Fluid-Loss Additive" dated 1999.

(Continued)

*Primary Examiner*—Paul Marcantoni
(74) *Attorney, Agent, or Firm*—Craig W. Roddy; Baker Botts

(57) ABSTRACT

Cement compositions are provided that comprise a hydraulic cement, water, and a set retarder composition, the set retarder composition comprising an acrylamide polymer derivative; and an iron compound. In some embodiments, cement compositions are provided that comprise a hydraulic cement comprising a cement, water, and a set retarder composition, the set retarder composition comprising a lignin-based retarder and an iron compound.

24 Claims, No Drawings

U.S. PATENT DOCUMENTS

| | | | |
|---|---|---|---|
| 5,149,370 A | 9/1992 | Olaussen et al. | 106/737 |
| 5,151,131 A | 9/1992 | Burkhalter et al. | 106/822 |
| 5,181,568 A | 1/1993 | McKown et al. | |
| 5,332,041 A * | 7/1994 | Onan et al. | 166/295 |
| 5,339,903 A | 8/1994 | Eoff et al. | 166/293 |
| 5,340,612 A * | 8/1994 | Perito | 427/403 |
| 5,340,860 A | 8/1994 | Brake et al. | 524/166 |
| 5,346,012 A * | 9/1994 | Heathman et al. | 166/293 |
| 5,355,955 A * | 10/1994 | Rodrigues et al. | 166/293 |
| 5,383,967 A | 1/1995 | Chase | 106/737 |
| 5,411,092 A | 5/1995 | Cowan | 166/293 |
| 5,421,881 A | 6/1995 | Rodrigues et al. | 106/809 |
| 5,439,057 A | 8/1995 | Weaver et al. | 166/295 |
| 5,443,636 A * | 8/1995 | Montgomery | 106/805 |
| 5,472,051 A | 12/1995 | Brothers | 166/293 |
| 5,494,513 A | 2/1996 | Fu et al. | 106/672 |
| 5,512,096 A * | 4/1996 | Krause | 106/718 |
| 5,536,311 A * | 7/1996 | Rodrigues | 106/724 |
| 5,547,506 A | 8/1996 | Rae et al. | 106/730 |
| 5,558,161 A | 9/1996 | Vitthal et al. | 166/280 |
| 5,571,318 A | 11/1996 | Griffith et al. | 106/725 |
| 5,587,012 A * | 12/1996 | Montgomery | 106/823 |
| 5,588,489 A | 12/1996 | Chatterji et al. | 166/293 |
| 5,653,797 A * | 8/1997 | Patel | 106/781 |
| 5,680,900 A | 10/1997 | Nguyen et al. | 166/295 |
| 5,749,418 A * | 5/1998 | Mehta et al. | 166/292 |
| 5,866,517 A | 2/1999 | Carpenter et al. | 507/226 |
| 5,968,255 A | 10/1999 | Mehta et al. | 106/727 |
| 5,972,103 A | 10/1999 | Mehta et al. | 106/728 |
| 5,986,276 A | 11/1999 | Labriola, II | |
| 5,988,279 A | 11/1999 | Udarbe et al. | 166/293 |
| 5,996,694 A | 12/1999 | Dewprashad et al. | 166/294 |
| 5,997,633 A * | 12/1999 | Montgomery | 106/804 |
| 6,085,840 A | 7/2000 | Laramay et al. | 166/293 |
| 6,089,318 A | 7/2000 | Laramay et al. | 166/293 |
| 6,170,575 B1 | 1/2001 | Reddy et al. | 166/293 |
| 6,182,758 B1 | 2/2001 | Vijn | 166/293 |
| 6,196,317 B1 | 3/2001 | Hardy | 166/295 |
| 6,227,294 B1 | 5/2001 | Chatterji et al. | 166/293 |
| 6,245,142 B1 | 6/2001 | Reddy et al. | 106/724 |
| 6,268,406 B1 | 7/2001 | Chatterji et al. | 523/130 |
| 6,372,037 B1 * | 4/2002 | Lebo, Jr. et al. | 106/677 |
| 6,379,456 B1 | 4/2002 | Heathman et al. | 106/724 |
| 6,405,801 B1 | 6/2002 | Vijn et al. | 166/293 |
| 6,457,524 B1 | 10/2002 | Roddy | 166/293 |
| 6,465,587 B1 | 10/2002 | Bair et al. | 526/240 |
| 6,478,869 B2 | 11/2002 | Reddy et al. | 106/724 |
| 6,494,951 B1 | 12/2002 | Reddy et al. | 106/705 |
| 6,497,283 B1 | 12/2002 | Eoff et al. | 166/293 |
| 6,590,050 B1 | 7/2003 | Bair et al. | 526/240 |
| 6,689,208 B1 | 2/2004 | Brothers | 6/794 |
| 6,715,552 B2 | 4/2004 | Eoff et al. | 166/293 |
| 6,739,806 B1 | 5/2004 | Szymanski et al. | 405/267 |
| 6,743,288 B2 | 6/2004 | Eoff et al. | 106/724 |
| 6,767,867 B2 | 7/2004 | Chatterji et al. | 507/216 |
| 6,939,536 B2 | 9/2005 | Chen et al. | |
| 7,063,153 B2 * | 6/2006 | Eoff et al. | 166/293 |
| 2002/0134283 A1 | 9/2002 | Vijn et al. | |
| 2003/0008779 A1 | 1/2003 | Chen et al. | 507/200 |
| 2003/0083204 A1 | 5/2003 | Chatterji et al. | 507/200 |
| 2004/0000403 A1 * | 1/2004 | Eoff et al. | 166/293 |
| 2004/0094070 A1 * | 5/2004 | Eoff et al. | 106/808 |
| 2004/0107877 A1 | 6/2004 | Getzlaf | 106/813 |
| 2004/0108113 A1 | 6/2004 | Luke et al. | 166/292 |
| 2004/0112600 A1 | 6/2004 | Luke et al. | 166/295 |
| 2004/0226483 A1 * | 11/2004 | Chatterji et al. | 106/802 |

FOREIGN PATENT DOCUMENTS

| | | |
|---|---|---|
| EP | 0 444 489 A1 | 9/1991 |
| EP | 0538989 A2 | 4/1993 |
| EP | 0 973 698 | 10/1998 |
| EP | 1 051 368 | 7/1999 |
| EP | 1 153 898 A1 | 11/2001 |
| GB | 2 210 888 A | 6/1989 |
| WO | WO 00/41981 | 7/2000 |
| WO | WO 2005/003053 A1 | 1/2005 |

OTHER PUBLICATIONS

Halliburton brochure entitled "Halad®-22A Fluid-Loss Additive" dated 1998.

Halliburton brochure entitled "Halad®-23 Fluid-Loss Additive" dated 2000.

Halliburton brochure entitled "Halad®-322 Fluid-Loss Additive" dated 1999.

Halliburton brochure entitled Halad®-344 Fluid-Loss Additive dated 1998.

Halliburton brochure entitled "Halad®-413 Fluid-Loss Additive" dated 1999.

Halliburton brochure entitled "Halad®-447 Fluid-Loss Additive" dated 1999.

Halliburton brochure entitled "Halad®-567 Fluid-Loss Additive" dated 2000.

Halliburton brochure entitled "Halad®-600 E+ Fluid-Loss Additive" dated 1999.

Halliburton brochure entitled "Halad®-700 Fluid-Loss Additive" dated 2000.

Halliburton brochure entitled "Fluid Loss Additives, Our Case For Halliburton Additives is Water Tight" dated 1994.

SPE 10623 entitled "Acrylamide/Acrylic Acid Copolymers for Cement Fluid Loss Control" by Lee McKenzie et al., dated 1982.

Halliburton brochure "HR®-25 Cement Retarder" dated 1999.

Halliburton brochure entitled "Silicalite Cement Additive" dated 1999.

Halliburton brochure entitled "SCR-500L™ High-Temperature Retarder" Dated 2000.

Halliburton brochure entitled "SCR-100 Cement Retarder" dated 1999.

Foreign communication from a related counterpart application dated Jun. 27, 2003.

U.S. communication from a related counterpart application dated Aug. 4, 2004.

Office action from a related counterpart application dated Dec. 21, 2004.

Office action from a related counterpart application dated Jan. 26, 2005.

Foreign communcation from a related counterpart application dated Jun. 27, 2003.

Office Action dated Jan. 12, 2007 from U.S. Appl. No. 10/945,487.

* cited by examiner

CEMENT COMPOSITIONS COMPRISING SET RETARDER COMPOSITIONS AND ASSOCIATED METHODS

CROSS-REFERENCE TO RELATED APPLICATIONS

This application is a divisional of U.S. patent application Ser. No. 10/891,384, entitled "Compositions Comprising Set Retarder Compositions and Associated Methods," filed on Jul. 14, 2004, now U.S. Pat. No. 7,021,380 which is a continuation-in-part of U.S. patent application Ser. No. 10/608,748 entitled "Cement Compositions with Improved Fluid Loss Characteristics and Methods of Cementing in Surface and Subterranean Applications," filed on Jun. 27, 2003 now U.S. Pat. No. 7,073,585.

BACKGROUND

The present invention relates to cementing operations, and more particularly, to cement compositions comprising set retarder compositions and methods of using the cement compositions in surface and subterranean applications.

Hydraulic cement compositions are commonly utilized in subterranean operations, particularly subterranean well completion and remedial operations. For example, hydraulic cement compositions are used in primary cementing operations whereby pipe strings such as casings and liners are cemented in well bores. In performing primary cementing, hydraulic cement compositions are pumped into the annular space between the walls of a well bore and the exterior surface of a pipe string disposed therein. The cement composition is permitted to set in the annular space, thereby forming an annular sheath of hardened substantially impermeable cement therein that substantially supports and positions the pipe string in the well bore and bonds the exterior surface of the pipe string to the walls of the well bore. Hydraulic cement compositions also are used in remedial cementing operations such as plugging highly permeable zones or fractures in well bores, plugging cracks and holes in pipe strings, and the like.

Set retarder compositions are a common additive that may be included in cement compositions, inter alia, to delay the set time of the cement composition. Among other things, set retarder compositions may be useful not only in delaying the set time of a cement composition exposed to high subterranean temperatures, but also to extend the time the cement composition may remain pumpable after the cement composition is mixed before it is placed into the desired location. While a variety of set retarder compositions have been developed and used successfully, they have drawbacks. For instance, conventional set retarder compositions may include lignosulfonates that may provide unpredictable retardation of the cement compositions set time. Furthermore, synthetic polymers also have been used as set retarder compositions with some success. These synthetic polymers, however, may be difficult to produce, which may add undesirable expense to the cementing operation.

Set retarder compositions also have been added to cement compositions for gel strength modification. When a cement composition becomes static, it develops a property commonly referred to as "gel strength." Gel strength is not compressive strength. Generally, there are two phases in the development of gel strength: "zero-gel time" and "transition time." Zero-gel time, which may also be referred to as "delayed-gel time", refers to the time period required for a cement composition to reach a gel strength of about 100 lbs per 100 ft$^2$. During the zero-gel time, it is believed that the cement composition retains the ability to transmit hydrostatic pressure. Accordingly, the cement composition may be able to prevent the influx of formation fluids (e.g., gas) into the cement composition from the subterranean formation and associated problems. The "transition time" of a cement composition refers to the period when the cement composition has sufficient gel strength to support itself yet cannot prevent the influx of formation fluids (e.g., gases), and ending when the cement composition achieves sufficient gel strength to prevent the influx of such formation fluids. Experimentally, the transition time may be approximated by measuring the time period in which the gel strength of a cement composition progresses from about 100 lbs per 100 ft$^2$ to about 500 lbs per 100 ft$^2$. Additives may be added to a cement composition for gel strength modification, inter alia, to increase the zero-gel time of a cement composition and/or accelerate the transition time of a cement composition. Additives for gel strength modification include synthetic polymers, such as copolymers of 2-acrylamido-2-methylpropanesulfonic acid and N,N-dimethylacrylamide; and polymers having a tannin backbone, wherein the tannin backbone has grafted thereto a graft portion consisting of vinylamide derivatives. While these additives have been developed and used successfully, the complexity associated with their production may add undesirable expense to the cementing operation.

SUMMARY

The present invention relates to cementing operations, and more particularly, to cement compositions comprising set retarder compositions and methods of using the cement compositions in surface and subterranean applications.

In one embodiment, the present invention provides a cement composition comprising a hydraulic cement, water, and a set retarder composition, the set retarder composition comprising an acrylamide polymer derivative and an iron compound present in the range of from at least about 0.24% by weight of the set retarder composition.

In another embodiment, the present invention provides a cement composition comprising a cement, water, and a set retarder composition, the set retarder composition comprising a lignin-based retarder and an iron compound.

In another embodiment, the present invention provides a set retarder composition that comprises an acrylamide polymer derivative and an iron compound present in the range of from at least about 0.24% by weight of the set retarder composition.

The features and advantages of the present invention will be apparent to those skilled in the art. While numerous changes may be made by those skilled in the art, such changes are within the spirit of the invention.

DETAILED DESCRIPTION

The present invention relates to cementing operations, and more particularly, to cement compositions comprising set retarder compositions and methods of using the cement compositions in surface and subterranean applications. While the compositions and methods of the present invention are useful in a variety of applications, they may be particularly useful for subterranean well completion and remedial operations, such as primary cementing, e.g., cementing casings and liners in well bores, including those in production wells, which include multi-lateral subterranean wells. They are also useful for surface cementing operations, including construction cementing operations.

The cement compositions of the present invention generally comprise a cement, water, and a set retarder composition of the present invention. A wide variety of optional additives may be included in the cement compositions of the present invention if desired. The cement compositions of the present invention may range in density from about 5 lb/gallon to about 30 lb/gallon. In one embodiment, the cement compositions of the present invention range in density from about 8 lb/gallon to about 20 lb/gallon.

Any cements suitable for use in subterranean applications are suitable for use in the present invention. Furthermore, cements suitable for use in surface applications, e.g., construction cements, may be suitable for use in the present invention. In one embodiment, the improved cement compositions of the present invention comprise a hydraulic cement. A variety of hydraulic cements are suitable for use including those comprised of calcium, aluminum, silicon, oxygen, and/or sulfur, which set and harden by reaction with water. Such hydraulic cements include, but are not limited to, Portland cements, pozzolanic cements, gypsum cements, high alumina content cements, silica cements, high alkalinity cements, and mixtures thereof. In some embodiments, the hydraulic cement comprises an API cement. The API cement may comprise API Classes A, B, C, G, H, or J Portland cements, or equivalents thereof. The above-mentioned API cements are defined and described in API Specification for Materials and Testing for Well Cements, API Specification 10A, 22nd Edition, dated Jan. 1, 1995 of the American Petroleum Institute.

The water utilized in the cement compositions of the present invention may be fresh water, saltwater (e.g., water containing one or more salts dissolved therein), brine (e.g., saturated saltwater), or seawater. Generally, the water may be from any source provided that it does not contain an excess of compounds that adversely affect the cement compositions. The water may be present in an amount sufficient to form a pumpable slurry. Generally, the water is present in the cement compositions of the present invention in an amount in the range of from about 15% to about 200% by weight of cement ("bwoc") therein. In certain embodiments, the water is present in the cement compositions of the present invention in an amount in the range of from about 25% to about 60% bwoc therein.

The set retarder compositions of the present invention generally comprise an iron compound and at least one of an acrylamide polymer derivative or a lignin-based retarder. Optionally, set retarder compositions of the present invention may further comprise hydratable polymers, dispersants, zeolites, shales, organic acids, silicas, deaggregation agents, or combinations thereof. Furthermore, in some embodiments the set retarder compositions of the present invention further may function as dispersants, inter alia, to reduce the apparent viscosity of the slurry to permit the pumping of the cement slurry with less friction pressure, and less hydraulic horsepower. In some embodiments, the set retarder compositions of the present invention further may function as free flow additives, wherein the set retarder compositions of the present invention may be blended with the cement, prior to its combination with water, to improve the ability of the dry cement flow freely. Furthermore, in some embodiments, the set retarder compositions of the present invention further may function to provide gel strength modification, for example, by accelerating the transition time of the cement composition.

In some embodiments, the set retarder compositions of the present invention comprise an acrylamide polymer derivative. Any polymer or salt thereof capable of retarding or delaying the set time of a cement composition and comprising monomers formed from 2-acrylamido-2-methylpropane sulfonic acid or derivatives thereof (e.g., acid salts of 2-acrylamindo-2-methylpropane sulfonic acid) will be an "acrylamide polymer derivative" as that term is used herein. In some embodiments, the acrylamide polymer derivative may be a copolymer or a terpolymer. Generally, monomers formed from 2-acrylamido-2methylpropane sulfonic acid or derivatives thereof have the following structure:

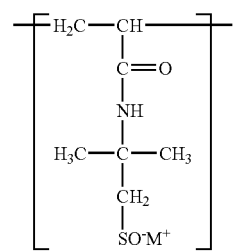

wherein M is hydrogen, ammonium, sodium, or potassium.

An example of a suitable acrylamide polymer derivative comprises a copolymer comprising first monomers formed from a hydrolyzed acrylamide, partially hydrolyzed acrylamide, a hydrolyzed acrylamide derivative, or a partially hydrolyzed acrylamide derivative and second monomers formed from 2-acrylamido-2-methylpropane sulfonic acid or derivatives thereof. Another example of a suitable acrylamide polymer derivative comprises a copolymer comprising first monomers formed from acrylic acid and second monomers formed from 2-acrylamido-2-methylpropane sulfonic acid or derivatives thereof. An example of a suitable copolymer comprising first monomers formed from acrylic acid and second monomers formed from 2-acrylamido-2-methylpropane sulfonic acid or derivatives thereof is commercially available under the trade designation "SCR-100™" retarder from Halliburton Energy Services, Inc., Duncan, Okla. In certain embodiments, where the acrylamide polymer derivative comprises a copolymer comprising first monomers formed from acrylic acid and second monomers formed from 2-acrylamido-2-methylpropane sulfonic acid or derivatives thereof, the second monomers may be present in the copolymer in an amount in the range of from about 40 mole percent ("%") to about 60 mole % with the remainder of the copolymer comprising the first monomers, in other embodiments, the second monomers may be present in an amount in the range of from about 45 mole % to about 55 mole %, and, in other embodiments, the second monomer may be present in an amount of about 50 mole %.

Another example of a suitable acrylamide polymer derivative is a copolymer comprising first monomers formed from a first acid and second monomers formed from 2-acrylamido-2-methylpropane sulfonic acid or derivatives thereof, wherein the first acid is represented by the formula:

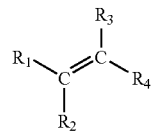

wherein: $R_1$ is H or $CH_3$, $R_2$ is H or COOH, $R_3$ is H or COOH, and $R_4$ is H, COOH, or $CH_2COOH$; provided that when $R_1$ is H and $R_2$ is COOH, $R_3$ and $R_4$ are different and are either H or COOH; when $R_1$ and $R_2$ are both H, $R_3$ is COOH and $R_4$ is $CH_2COOH$; and when $R_1$ is $CH_3$, $R_2$ is COOH and $R_3$ and $R_4$ are different and are either H or COOH. Examples of suitable acids within the scope of the above structure are maleic acid, itaconic acid, fumaric acid, citraconic acid, mesaconic acid, and other similar acids. An example of a suitable acrylamide polymer derivative that comprises a copolymer comprising first monomers formed from maleic acid and second monomers formed from 2-acrylamido-2-methylpropane sulfonic acid or derivatives thereof is commercially available under the trade designation "SCR-500™" retarder from Halliburton Energy Services, Inc., Duncan, Okla. In certain embodiments, where the acrylamide polymer derivative comprises a copolymer comprising monomers formed from a first acid, as described above, and second monomers formed from 2-acrylamido-2-methylpropane sulfonic acid or derivatives thereof, the first monomers may be present in the copolymer in an amount in the range of from about 5 mole % to about 50 mole % with the remainder of the copolymer comprising the second monomer, and, in other embodiments, the first monomers may be present in an amount in the range of from about 30 mole % to about 50 mole %.

Another example of a suitable acrylamide polymer derivative comprises a terpolymer comprising a first monomer formed from a first acid, as described above, second monomers formed from 2-acrylamido-2-methylpropane sulfonic acid or derivatives thereof, and third monomers different from the first monomers and the second monomers. In some embodiments, the third monomers are formed from maleic acid, acrylic acid, sodium methallyl sulfonate, sodium-p-sulfophenyl methallyl ether, sodium p-vinyl benzene sulfonate, acrylamide, N,N-dimethylacrylamide, vinyl sulfonic acid, acrylonitrile, 1-vinyl-2-pyrrolidone, vinyl phosphonic acid, diallydimethylammonium chloride, water soluble acrylates, methacrylates, acrylamide derivatives, or cationic monomers, such as dimethylaminoethyl methacrylatemethylchloride, diethylaminoethyl methacrylate, dimethyl aminoethyl acrylate methyl chloride, N-dimethyl aminopropyl methacrylamide, methacrylamido propyltrimethyl ammonium chloride, N,N-dimethylaminoethyl methacrylate, and 2-triethylammoniummethyl methacrylate chloride, or the like. Generally, in some embodiments, the first monomers may be present in the terpolymer in an amount in the range of from about 5 mole % to about 50 mole %, the second monomers may be present in the terpolymer in an amount in the range of from about 90 mole % to about 45 mole %, and the third monomers may be present in the terpolymer in an amount in the range of from about 5 mole % to about 50 mole %.

Generally, the acrylamide polymer derivatives included in the set retarder compositions of the present invention may be manufactured in accordance with any suitable technique for polymer manufacture, such as any of a variety of free radical techniques. Examples of suitable acrylamide polymer derivatives are described in U.S. Pat. Nos. 4,941,536 and 5,536,311, the relevant disclosure of which are incorporate herein by reference. In certain embodiments, the acrylamide polymer derivative may have a weight average molecular weight of below about 50,000.

As those of ordinary skill in the art may appreciate, certain acrylamide polymer derivatives may have little impact on the set retardation of a cement composition. For example, certain acrylamide polymer derivatives may have little impact on the set retardation of a cement composition in wells having a bottom hole static temperature ("BHST") of greater than about 200° F. For example, acrylamide polymer derivatives that comprise a copolymer comprising monomers formed from N,N-dimethylacrylamide and monomers formed from 2-acrylamido-2-methylpropane sulfonic acid or acid salts thereof may have little impact on set retardation in wells having a BHST of greater than about 200° F. One of ordinary skill in the art, with the benefit of this disclosure, will be able to determine other acrylamide polymer derivatives that may have little impact on the set retardation of a cement composition.

Generally, the acrylamide polymer derivative may be present in the set retarder composition of the present invention in an amount in the range of from about 1% to about 95% by weight. In some embodiments, the acrylamide polymer derivative is present in the set retarder composition of the present invention in an amount in the range of from about 30% to about 60% by weight. In some embodiments, the acrylamide polymer derivative is present in the set retarder composition of the present invention in an amount of about 45% to about 50% by weight.

In other embodiments, the set retarder compositions of the present invention may comprise a lignin-based retarder. As referred to herein, a "lignin-based retarder" refers to any suitable composition comprising a lignosulfonate, wherein the composition is capable is capable of delaying the set time of a cement composition. Lignosulfonates generally comprise metallic sulfonate salts made from the lignin of sulfite pulp mill liquor. In some embodiments, the lignin-based retarder comprises a lignosulfonate and a sulfonated lignin. The sulfonated lignin may be produced by the kraft process, e.g., a sulfonate kraft lignin. The sulfonated lignin should contain at least about 2% organic sulphur, and, in some embodiments, contain in the range of from about 3.5% to about 7% organic sulphur. In another embodiment, the lignin-based retarder further comprises a sugar acid. In an exemplary embodiment, the sugar acid included in the lignin-based retarder is derived from xylose, e.g., xylose sugar acid. In some embodiments, the lignin-based retarder comprises about 59 parts by weight lignosulfonate, about 11 parts by weight sugar acid, and about 30 parts by weight sulfonated lignin. An example of a suitable lignin-based retarder is commercially available under the trade name "HR-601" from Halliburton Energy Services, Duncan, Okla. Examples of suitable lignin-based retarders are described in U.S. Pat. Nos. 6,227,294 and 6,372,037, the relevant disclosures of which are incorporated herein by reference.

Generally, the lignin-based retarder may be present in the set retarder composition of the present invention in an amount in the range of from about 1% to about 95% by weight. In some embodiments, the lignin-based retarder is present in the set retarder composition of the present invention in an amount in the range of from about 30% to about 60% by weight. In some embodiments, the lignin-based retarder is present in the set retarder composition of the present invention in an amount of about 45% to about 50% by weight.

The set retarder compositions of the present invention further comprise iron compounds. Suitable iron compounds include any soluble iron compound that functions with the acrylamide polymer derivatives to provide set retardation of a cement composition, including, but not limited to, iron chloride and iron gluconates. Generally, the iron chloride may be ferrous chloride, ferric chloride, or mixtures thereof. The iron compound functions, inter alia, in combination with other components which may be present, to aid the cement composition in hydrating in a predictable manner. Inter alia, the iron compound component may also improve the compressive strength of the cement composition in which it is used. Furthermore, it is believed that the iron compound may have synergistic effects with the acrylamide polymer derivative that may reduce the amount of an acrylamide polymer derivative needed to provide a desired level of set retardation. In one embodiment, the iron chloride used in the set retarder compositions of the present invention is anhydrous ferric chloride. An example of a suitable source of anhydrous ferric chloride is commercially available from BASF Corporation in Germany. Another source of a suitable iron chloride is a multi-purpose cement additive commercially available under the trade designation "UNIVERSAL CEMENT SYSTEMS™" from Halliburton Energy Services, Inc., of Duncan, Okla.; such additive is disclosed in U.S. Pat. Nos. 5,749,418; 5,968,255; and 5,972,103, the relevant disclosures of which are herein incorporated by reference. Generally, in some embodiments, Universal Cement Systems™ multi-purpose cement additive may comprise in the range from about 0.5% to about 30% iron chloride by weight. The iron compound is generally present in the set retarder composition of the present invention in an amount sufficient to allow the cement to be suitable for the subterranean environment of the well being cemented. In some embodiments, the iron compound is present in the set retarder composition of the present invention in an amount in the range of from about 5% to about 25% by weight. In some embodiments, the iron compound is present in the set retarder composition of the present invention in an amount in the range of from about 10% to about 15% by weight.

Optionally, the set retarder compositions of the present invention may comprise a dispersant. Where present, the dispersant acts, inter alia, to control the rheology of the cement composition and to stabilize the cement composition over a broad density range. While a variety of dispersants known to those skilled in the art may be used in accordance with the present invention, a suitable dispersant is a water-soluble polymer prepared by the caustic-catalyzed condensation of formaldehyde with acetone wherein the polymer contains sodium sulfate groups. Such a dispersant is commercially available under the trade designation "CFR-3™" from Halliburton Energy Services, Inc., Duncan, Okla. Another suitable dispersant is commercially available under the trade designation "CFR-1™," also from Halliburton Energy Services, Inc., of Duncan, Okla. Another source of a suitable dispersant is a multi-purpose cement additive commercially available under the trade designation "UNIVERSAL CEMENT SYSTEMS™" from Halliburton Energy Services, Inc., of Duncan, Okla.; such additive is disclosed in U.S. Pat. Nos. 5,749,418; 5,968,255; and 5,972,103, the relevant disclosures of which are incorporated herein by reference. Generally, in some embodiments, Universal Cement Systems™ multi-purpose cement additive may comprise in the range of from about 5% to about 70% of a dispersant by weight. Where used, the dispersant is present in the set retarder composition of the present invention in an amount sufficient to prevent gelation of the cement composition. In some embodiments, the dispersant is present in the set retarder composition of the present invention in an amount in the range of from about 5% to about 70% by weight. In some embodiments, the dispersant is present in the set retarder composition of the present invention in an amount in the range of from about 20% to about 40% by weight.

Optionally, the set retarder compositions of the present invention may comprise a hydratable polymer. Where present, the hydratable polymer acts, inter alia, to increase the viscosity of the cement composition in which the set retarder composition of the present invention is used. Various hydratable polymers can be utilized in the fluid loss control additive including, but not limited to, carboxymethylcellulose, hydroxyethylcellulose, carboxymethylhydroxyethylcellulose, vinyl sulfonated polymers, and hydratable graft polymers. An example of a suitable hydratable polymer is a cellulose derivative commercially available from Dow Chemical Co., under the trade name "CARBOTRON 20." Another source of a suitable hydratable polymer is a multi-purpose cement additive commercially available under the trade designation "UNIVERSAL CEMENT SYSTEMS™" from Halliburton Energy Services, Inc., of Duncan, Okla.; such additive is disclosed in U.S. Pat. Nos. 5,749,418; 5,968,255; and 5,972,103, the relevant disclosures of which are herein incorporated by reference. Generally, in some embodiments, the Universal Cement Systems™ multi-purpose cement additive may comprise in the range from about 1% to about 20% of a hydratable polymer by weight. Where used, the hydratable polymer is present in the set retarder composition of the present invention in an amount sufficient to contribute a desired degree of viscosity to the cement composition. In some embodiments, the hydratable polymer is present in the set retarder composition of the present invention in an amount in the range of from about 0.1% to about 15% by weight. In some embodiments, the hydratable polymer is present in the set retarder composition in an amount in the range of from about 1.0% to about 5% by weight.

Optionally, the set retarder compositions of the present invention may comprise a zeolite. Where used, the zeolite functions, inter alia, to improve the suspension of the set retarder compositions of the present invention in a cement composition. The zeolite comprises a mixture of chabazite and amorphous silica. The chabazite is present in the zeolite in an amount in the range of from about 50% to about 75% by weight. In some embodiments, the chabazite is present in the zeolite in an amount in the range of from about 65% about 70% by weight. The amorphous silica is generally present in the zeolite in an amount in the range of from about 25% to about 50% by weight. In some embodiments, the amorphous silica is present in the zeolite in an amount in the range of from about 30% to about 35% by weight. An example of a suitable source of zeolite is available from the C2C Zeolite Corporation of Calgary, Canada. Where used, the zeolite is generally present in the set retarder composition of the present invention in an amount in the range of from about 0.1% to about 15% by weight. In certain embodiments, the zeolite is present in the set retarder composition of the present invention in an amount in the range of from about 3% to about 7% by weight.

The set retarder compositions of the present invention also may optionally comprise shale. Where used, the shale functions, inter alia, to improve the ability of the set retarder composition to flow freely as a powder. A variety of shales are suitable, including those comprised of silicon, aluminum, calcium, and/or magnesium. In some embodiments, the shale is vitrified shale. In certain embodiments, the vitrified shale may be fine grain vitrified shale, wherein the fine grain vitrified shale has a particle size distribution in the range of from about 2 to about 4,750 micrometers. An example of a suitable fine grain vitrified shale is "PRESSURE-SEAL® FINE LCM," which is commercially available from TXI Energy Services, Inc., Houston, Tex. In another embodiment, the vitrified shale may be coarse grain vitrified shale, wherein the coarse vitrified shale particles may have a particle size distribution in the range of from about 2 micrometers to about 4,750 micrometers. An example of a suitable coarse grain vitrified shale is "PRESSURE-SEAL® COARSE LCM," which is commercially available from TXI Energy Services, Inc., Houston, Tex. Where used, the shale is generally present in the set retarder composition of the present invention in an amount in the range of from about 0.1% to about 15% by weight. In certain embodiments, the shale is present in the set retarder composition of the present invention in an amount in the range of from about 3% to about 7% by weight.

Optionally, the set retarder compositions of the present invention further may comprise an organic acid. Where present, the organic acid acts, inter alia, to maintain the viscosity of the cement composition in which the set retarder composition of the present invention is included over a broad density range by helping to prevent gelation of the cement composition. Various organic acids can be included in the set retarder composition including, but not limited to, tartaric acid, citric acid, gluconic acid, oleic acid, phosphoric acid, and uric acid. An example of a suitable organic acid is commercially available from Halliburton Energy Services, Inc., of Duncan, Okla., under the trade name "HR®-25." A suitable organic acid also may be included in Universal Cement Systems™ multi-purpose cement additive in an amount in the range of from about 0.01% to about 10% by weight. Other examples of suitable organic acids include, for example, organic acids which have either minimal or no effect on retarding or accelerating the setting of the cement. One of ordinary skill in the art with the benefit of this disclosure will recognize the types of organic acids which are appropriate for inclusion in the improved fluid loss control additives of the present invention. Where used, the organic acid is present in the fluid loss control additive in an amount sufficient to provide a desired degree of viscosity control. In some embodiments, the organic acid is present in the set retarder composition of the present invention in an amount in the range of from about 0.01% to about 5% by weight. In some embodiments, the organic acid is present in the set retarder composition of the present invention in an amount in the range of from about 0.01% to about 2% by weight.

Optionally, the set retarder compositions of the present invention may contain a deaggregation agent. Where used, the deaggregation agent functions, inter alia, to improve the ability of the set retarder composition of the present invention to flow freely as a powder. The deaggregation agent may also contribute a minor source of silica to the set retarder composition. An example of a suitable deaggregation agent is commercially available from National Pigment and Chemical Co. under the trade name Mica/Brite X150. Alternatively, quartz or ground sand may be used, though the spherical nature of Mica/Brite X150 particles is thought to contribute to improved flow characteristics for the cement composition. A suitable deaggregation agent also may be included in Universal Cement Systems™ multi-purpose cement additive in an amount in the range of from about 1% to about 30% by weight. Where used, the deaggregation agent is present in the set retarder composition of the present invention in an amount sufficient to enable the set retarder composition of the present invention to flow freely as a powder. In some embodiments, the deaggregation agent is present in the set retarder composition of the present invention in an amount in the range of from about 1% to about 15% by weight. In some embodiments, the deaggregation agent is present in the set retarder composition of the present invention in an amount in the range of from about 1% to about 10% by weight.

Optionally, the set retarder compositions of the present invention may comprise a source of silica. Where present, the silica assists in maintaining the compressive strength of the cement composition after setting. An example of a suitable source of high surface area amorphous silica is commercially available from Halliburton Energy Services, Inc., of Duncan, Okla., under the trade name "SILICALITE." A suitable source of silica also may be included in Universal Cement Systems™ multi-purpose cement additive in an amount in the range of from about 1% to about 50% by weight. Where used, the high surface area amorphous silica is present in a set retarder composition of the present invention in an amount sufficient to provide a desired after-set compressive strength. In some embodiments, the high surface area amorphous silica is present in the set retarder composition of the present invention in an amount in the range of from about 0.1% to about 15% by weight. In one embodiment, the high surface area amorphous silica is present in the set retarder composition of the present invention in an amount in the range of from about 1% to about 5% by weight.

Generally, the set retarder compositions of the present invention should be present in the cement compositions of the present invention in an amount sufficient to provide the desired set retardation in the cement compositions of the present invention. The amount of a particular set retarder composition to include generally depends on a number of factors, including the bottom hole circulating temperature of the well, the particular set retarder composition chosen, and other factors known to those of ordinary skill in the art. In some embodiments, the quantity of the set retarder composition to be included in the cement composition may be determined prior to preparation of the cement composition. For example, the quantity of the set retarder composition to be included in the cement composition may be determined by performing thickening time tests of the type described in API Specification 10A, Twenty-Third Edition, April 2002. More particularly, in certain embodiments, the set retarder composition of the present invention is present in the cement composition in an amount in the range of from about 0.01% to about 10% bwoc. In some embodiments, the set retarder composition of the present invention is present in the cement composition in an amount in the range of from about 0.01% to about 5% bwoc.

The set retarder compositions of the present invention may be prepared in a variety of forms, including, inter alia, particulates, solutions, suspensions. In some embodiments, it is believed that preblending of the components of a set retarder composition prior to their combination with the other components of the cement composition may aid the functionality of the set retarder composition. For example, the set retarder composition of the present invention may be formed by preblending an acrylamide polymer derivative with an iron compound. Furthermore, additional components, such as dispersants, hydratable polymers, zeolite, shale, organic acids, deaggregation agents, silicas, and combinations thereof, may be preblended with the acrylamide polymer derivative and the iron compound to form the set retarder composition. In some embodiments, preblending may include dry blending the acrylamide polymer derivative, the iron compound, and any other optional components of the set retarder composition, for example, where the set retarder composition is provided in particulate form. In other embodiments, preblending the set retarder composition may include preparing a solution or a suspension that comprises the acrylamide polymer derivative, the iron compound, and any other optional components of the set retarder composition. Furthermore, the cement compositions of the present invention may be prepared using any suitable methodology. In some embodiments, the components of the set retarder composition of the present invention may be preblended prior to the preparation of the cement composition. Next, the cement composition is prepared by combining the cement, water, and set retarder composition. In some embodiments, for example, where the set retarder composition is provided as a solution or a suspension, the set retarder composition may first be added to the water prior to their combination with the cement. In other embodiments, for example, when desired to improve the flow characteristics of the dry cement, the preblended set retarder composition, in particulate form, may be combined (e.g., dry blended) with the cement prior to their combination with the water. In other embodiments, the components of the set retarder composition may be individually added to the cement, water, and/or a combination thereof as desired by one skilled in the art.

As will be recognized by those skilled in the art, the cement compositions of this invention also may include additional suitable additives, including, inter alia, accelerants, defoamers, microspheres, fiber, weighting materials, salts, vitrified shale, fly ash, and the like. Any suitable additive may be incorporated within the cement compositions of the present invention. One of ordinary skill in the art with the benefit of this disclosure will be able to recognize where a particular additive is suitable for a particular application.

In one embodiment, the present invention provides a cement composition that comprises a cement comprising an API cement, water, and a set retarder composition, the set retarder composition comprising an acrylamide polymer derivative and an iron compound.

In another embodiment, the present invention provides a cement composition that comprising a cement, water, and a set retarder composition, the set retarder composition comprising a lignin-based retarder and an iron compound.

In another embodiment, the present invention provides a set retarder composition that comprises an acrylamide polymer derivative and an iron compound. An example of a set retarder composition of the present invention comprises 50% of an acrylamide polymer derivative (SCR-100™) by weight and 50% of Universal Cement Systems™ multi-purpose cement additive by weight. Another example of a set retarder composition of the present invention comprises 47.5% of an acrylamide polymer derivative (SCR-100™) by weight, 47.5% of Universal Cement Systems™ multi-purpose cement additive by weight, and 5.0% of zeolite by weight. Another example of a set retarder composition of the present invention comprises 47.5% of an acrylamide polymer derivative (SCR-100™) by weight, 47.5% of Universal Cement Systems™ multi-purpose cement additive by weight, and 5.0% of vitrified shale by weight.

To facilitate a better understanding of the present invention, the following illustrative examples of some of the preferred exemplary embodiments are given. In no way should such examples be read to limit, or define, the entire scope of the invention.

EXAMPLE 1

Sample compositions were prepared according to the following procedure. Each sample was dry blended, then mixed for 35 seconds at 15,000 rpm in a Waring blender. After sample preparation, compressive strength tests and thickening time tests were performed on each of the samples using an ultrasonic cement analyzer according to API Specification 10A, Twenty-Third Edition, April 2002. Furthermore, the time for each of the samples to reach a compressive strength of 50 psi and 500 psi, respectively, was recorded. Each sample composition was brought up to 220° F. and 3,000 psi in 60 minutes. Next, the sample compositions were brought up to 250° F. in 240 minutes while static. Thickening time tests were performed at 220° F.

Sample Composition No. 1 (comparative) was prepared by mixing 35% crystalline or non-crystalline silica bwoc, 0.5% of HALAD® 344 fluid loss additive bwoc, 0.5% of an acrylamide polymer derivative (SCR-100™) bwoc, Texas Lehigh Class H cement, and sufficient water to provide a 16.9 ppg slurry. The crystalline or non-crystalline silica used in these examples has a particle size in the range of from about 2 to about 2,000 microns. HALAD® 344 is a fluid loss control additive that is commercially available from Halliburton Energy Services, Duncan, Okla. The thickening time was found to be 4 hours and 33 minutes at 220° F.

Sample Composition No. 2 was prepared by mixing 35% crystalline or non-crystalline silica bwoc, 0.5% of HALAD® 344 fluid loss additive bwoc, 1% of a set retarder composition of the present invention bwoc, Texas Lehigh Class H cement, and sufficient water to provide a 16.9 ppg slurry. The set retarder composition of the present invention comprised an acrylamide polymer derivative (SCR-100™) and Universal Cement Systems™ multi-purpose cement additive in a 1:1 ratio by weight. Accordingly, the sample composition comprised 0.5% of the acrylamide polymer derivative (SCR-100™) bwoc and 0.5% of Universal Cement Systems™ multi-purpose cement additive bwoc. The thickening time was found to be 6 hours and 4 minutes at 220° F.

Sample Composition No. 3 was prepared by mixing 35% crystalline or non-crystalline silica bwoc, 0.5% of HALAD® 344 fluid loss additive bwoc, 0.85% of a set retarder composition of the present invention bwoc, Texas Lehigh Class H cement, and sufficient water to provide a 16.9 ppg slurry. The set retarder composition of the present invention comprised an acrylamide polymer derivative (SCR-100™) and Universal Cement Systems™ multi-purpose cement additive in a 35:50 ratio by weight. Accordingly, the sample composition comprised 0.35% of the acrylamide polymer derivative (SCR-100™) bwoc and 0.50% of Universal Cement Systems™ multi-purpose cement additive bwoc. The thickening time was found to be 4 hours and 47 minutes at 220° F.

Sample Composition No. 4 was prepared by mixing 35% crystalline or non-crystalline silica bwoc, 0.5% of HALAD® 344 fluid loss additive bwoc, 0.73% of a set retarder composition of the present invention bwoc, Texas Lehigh Class H cement, and sufficient water to provide a 16.9 ppg slurry. The components of the set retarder composition of the present invention were preblended and the set retarder composition was set aside for about 1 week prior to sample preparation. The set retarder composition of the present invention comprised 47.5% of an acrylamide polymer derivative (SCR-100™) by weight, 47.5% of Universal Cement Systems™ multi-purpose cement additive by weight, and 5% zeolite by weight. Accordingly, the sample composition comprised 0.35% of the acrylamide polymer derivative (SCR-100™) bwoc, 0.35% of Universal Cement Systems™ multi-purpose cement additive bwoc, and 0.03% zeolite bwoc. The thickening time was found to be 4 hours and 58 minutes at 220° F.

Sample Composition No. 5 was prepared by mixing 35% crystalline or non-crystalline silica bwoc, 0.5% of HALAD® 344 fluid loss additive bwoc, and 0.7% of a set retarder composition of the present invention bwoc, Texas Lehigh Class H cement, and sufficient water to provide a 16.9 ppg slurry. The set retarder composition of the present invention comprised an acrylamide polymer derivative (SCR-100™) and Universal Cement Systems™ multi-purpose cement additive in a 1:1 ratio by weight. Accordingly, the sample composition comprised 0.35% of the acrylamide polymer derivative (SCR-100™) bwoc and 0.35% of Universal Cement Systems™ multi-purpose cement additive bwoc. The thickening time was found to be 5 hours and 1 minute at 220° F.

Sample Composition No. 6 was prepared by mixing 35% crystalline or non-crystalline silica bwoc, 0.5% of HALAD® 344 fluid loss additive bwoc, 0.73% of a set retarder composition of the present invention bwoc, Texas Lehigh Class H cement, and sufficient water to provide a 16.9 ppg slurry. The components of the set retarder composition were preblended and the set retarder composition was set aside for about 1 week prior to sample preparation. The set retarder composition of the present invention comprised 47.5% of an acrylamide polymer derivative (SCR-100™) by weight, 47.5% of Universal Cement Systems™ multi-purpose cement additive by weight, and 5% of fine grain vitrified shale (PRESSURE-SEAL® FINE LCM) by weight. Accordingly, the sample composition comprised 0.35% of the acrylamide polymer derivative (SCR-100™) bwoc, 0.35% of Universal Cement Systems™ multi-purpose cement additive bwoc, and 0.03% fine grain vitrified shale bwoc. The thickening time was found to be 5 hours and 33 minutes at 220° F.

Sample Composition No. 7 (comparative) was prepared by mixing 35% crystalline or non-crystalline silica bwoc, 0.5% of HALAD® 344 fluid loss additive bwoc, 0.5% of a lignin-based retarder (HR-601) bwoc, Texas Lehigh Class H cement, and sufficient water to provide a 16.9 ppg slurry. The thickening time was found to be 3 hours and 4 minutes at 220° F.

Sample Composition No. 8 was prepared by mixing 35% crystalline or non-crystalline silica bwoc, 0.5% of HALAD® 344 fluid loss additive bwoc, 0.73% of a set retarder composition of the present invention bwoc, Texas Lehigh Class H cement, and sufficient water to provide a 16.9 ppg slurry. The components of the set retarder composition were preblended and the set retarder composition was set aside for about 1 week prior to sample preparation. The set retarder composition of the present invention comprised 47.5% of a lignin-based retarder (HR-601) by weight, and 47.5% of Universal Cement Systems™ multi-purpose cement additive by weight, and 5% zeolite by weight. Accordingly, the sample composition comprised 0.35% of a lignin-based retarder (HR-601) bwoc, 0.35% of Universal Cement Systems™ multi-purpose cement additive bwoc, and 0.03% zeolite bwoc. The thickening time was found to be 2 hours and 44 minutes at 220° F.

A summary of the composition of each of the samples is depicted below in Table 1.

TABLE 1

| FLUID | % SCR-100 ™ | % HR-601 | % Universal Cement Systems ™ | % Zeolite | % Vitrified Shale |
|---|---|---|---|---|---|
| Sample Composition No. 1 | 0.5 | 0 | 0 | 0 | 0 |
| Sample Composition No. 2 | 0.5 | 0 | 0.5 | 0 | 0 |
| Sample Composition No. 3 | 0.35 | 0 | 0.5 | 0 | 0 |
| Sample Composition No. 4 | 0.35 | 0 | 0.35 | 0.03 | 0 |
| Sample Composition No. 5 | 0.35 | 0 | 0.35 | 0 | 0 |
| Sample Composition No. 6 | 0.35 | 0 | 0.35 | 0 | 0.03 |
| Sample Composition No. 7 | 0 | 0.5 | 0 | 0 | 0 |
| Sample Composition No. 8 | 0 | 0.35 | 0.35 | 0.03 | 0 |

A summary of the thickening times and compressive strengths for each of the sample compositions is depicted below in Table 2.

TABLE 2

| FLUID | Thickening Time at 220° F. (hr:min) | Time for 50 psi Compressive Strength at 250° F. (hr:min) | Time for 500 psi Compressive Strength at 250° F. (hr:min) | 12 Hour Compressive Strength at 250° F. (psi) | 24 Hour Compressive Strength at 250° F. (psi) |
|---|---|---|---|---|---|
| Sample Composition No. 1 | 4:33 | 5:32 | 6:06 | 2000 | 3007 |
| Sample Composition No. 2 | 6:04 | 5:43 | 6:25 | 2200 | 3468 |
| Sample Composition No. 3 | 4:47 | 4:15 | 5:25 | 2220 | 3334 |

TABLE 2-continued

| FLUID | Thickening Time at 220° F. (hr:min) | Time for 50 psi Compressive Strength at 250° F. (hr:min) | Time for 500 psi Compressive Strength at 250° F. (hr:min) | 12 Hour Compressive Strength at 250° F. (psi) | 24 Hour Compressive Strength at 250° F. (psi) |
|---|---|---|---|---|---|
| Sample Composition No. 4 | 4:58 | 4:17 | 5:29 | 2300 | 3451 |
| Sample Composition No. 5 | 5:01 | 4:34 | 5:09 | 2287 | 3304 |
| Sample Composition No. 6 | 5:33 | 4:50 | 5:28 | 2217 | 3158 |
| Sample Composition No. 7 | 3:04 | 3:30 | 4:10 | 2435 | 3442 |
| Sample Composition No. 8 | 2:44 | 3:36 | 4:10 | 2544 | 3467 |

Therefore, Example 1 indicates, inter alia, that the use of a set retarder composition of the present invention comprised of a reduced dose of an acrylamide polymer derivative or lignin-based retarder delivers cement set retardation comparable to a larger dose of the acrylamide polymer derivative or lignin-based retarder.

EXAMPLE 2

Sample compositions were prepared according to the following procedure. Each sample was dry blended, then mixed for 35 seconds at 15,000 rpm in a Waring blender. The liquid components were mixed with the water prior to combination with the dry components. After sample preparation, compressive strength tests and thickening time tests were performed on each of the samples using an Ultrasonic cement analyzer according to API Specification 10A, Twenty-Third Edition, April 2002. Furthermore, the time for each of the samples to reach a compressive strength of 50 psi and 500 psi, respectively, was recorded. Each sample composition was brought up to 220° F. and 3,000 psi in 60 minutes. Next, the sample compositions were brought up to 250° F. in 240 minutes while static. Thickening time tests were performed at 220° F.

Sample composition No. 9 (comparative) was prepared by mixing 0.12 gallons of an acrylamide polymer derivative (SCR-100™L) per sack of cement with a 16.9 ppg slurry, the slurry comprised 35% crystalline or non-crystalline silica bwoc, 0.5% of HALAD® 344 fluid loss additive bwoc, Texas Lehigh Class H cement, and sufficient water to provide a 16.9 ppg slurry. Accordingly, as powdered equivalent, the sample composition comprised 0.5% of the acrylamide polymer derivative (SCR-100™) bwoc. The thickening time was found to be 5 hours and 6 minutes at 220° F.

Sample composition No. 10 was prepared by mixing 0.173 gallons of a set retarder composition of the present invention per sack of cement with 16.9 ppg slurry, the slurry comprised 35% crystalline or non-crystalline silica bwoc, 0.5% of HALAD® 344 fluid loss additive bwoc, Texas Lehigh Class H cement, and sufficient water to provide a 16.9 ppg slurry. The set retarder composition of the present invention comprised an acrylamide polymer derivative (SCR-100™) and Universal Cement Systems™ multi-purpose cement additive in a 1:1 ratio by weight. Accordingly, as powdered equivalent, the sample composition comprised 0.35% of the acrylamide polymer derivative (SCR-100™) bwoc and 0.35% of Universal Cement Systems™ multi-purpose cement additive bwoc. The thickening time was found to be 5 hours and 15 minutes at 220° F.

Sample composition No. 11 was prepared by mixing 0.173 gallons of a set retarder composition of the present invention per sack of cement with 16.9 ppg slurry, the slurry comprising 35% crystalline or non-crystalline silica bwoc, 0.5% of HALAD® 344 fluid loss additive bwoc, Texas Lehigh Class H cement, and sufficient water to provide a 16.9 ppg slurry. The set retarder composition was preblended and set a side for about one week prior to sample preparation. The set retarder composition of the present invention comprised an acrylamide polymer derivative (SCR-100™) and Universal Cement Systems™ multi-purpose cement additive in a 1:1 ratio by weight. Accordingly, as powdered equivalent, the sample composition comprised 0.35% of the acrylamide polymer derivative (SCR-100™) bwoc and 0.35% of Universal Cement Systems™ multi-purpose cement additive bwoc. The thickening time was found to be 5 hours and 20 minutes at 220° F.

A summary of the thickening times for each of the samples is depicted below in Table 3.

TABLE 3

| FLUID | % SCR-100 ™ | % Universal Cement Systems ™ | Thickening Time at 220° F. (hr:min) |
|---|---|---|---|
| Sample Composition No. 9 | 0.5 | 0 | 5:06 |
| Sample Composition No. 10 | 0.35 | 0.35 | 5:15 |
| Sample Composition No. 11[1] | 0.35 | 0.35 | 5:20 |

[1]The SCR-100 ™ and Universal Cement Systems ™ multi-purpose cement additive were preblended.

A summary of the compressive strengths for each of the samples is depicted below in Table 4.

TABLE 4

| FLUID | % SCR-100 ™ | % Universal Cement Systems ™ | Time for 50 psi Compressive Strength at 250° F. (hr:min) | Time for 500 psi Compressive Strength at 250° F. (hr:min) | 12 Hour Compressive Strength at 250° F. (psi) | 24 Hour Compressive Strength at 250° F. (psi) |
|---|---|---|---|---|---|---|
| Sample Composition No. 9 | 0.5 | 0 | 5:20 | 6:02 | 2050 | 2978 |
| Sample Composition No. 10 | 0.35 | 0.35 | 4:31 | 5:07 | 2147 | 3222 |
| Sample Composition No. 11[1] | 0.35 | 0.35 | 4:17 | 5:07 | 2098 | 3055 |

[1]The SCR-100 ™ and Universal Cement Systems ™ multi-purpose cement additive were preblended.

Therefore, Example 2 indicates, inter alia, that the use of a set retarder composition of the present invention comprised of a reduced dose of an acrylamide polymer derivative delivers cement set retardation comparable to a larger dose of the acrylamide polymer derivative.

EXAMPLE 3

Sample compositions were prepared according to the following procedure. Each sample was dry blended, then mixed for 35 seconds at 15,000 rpm in a blender. Then, a static gel strength test was performed. The sample compositions were brought up to 220° F. and 10,400 psi in 60 minutes. The sample compositions were stirred for another 15 minutes and then brought up to 250° in 240 minutes while static.

Sample Composition No. 12 (comparative) was prepared by mixing 35% crystalline or non-crystalline silica bwoc, 0.5% of HALAD® 344 fluid loss additive bwoc, 0.5% of an acrylamide polymer derivative (SCR-100™) bwoc, Texas Lehigh Class H cement, and sufficient water to provide a 16.9 ppg slurry. The zero-gel time was found to be 46 minutes and the transition time was found to be 30 minutes.

Sample Composition No. 13 was prepared by mixing 35% crystalline or non-crystalline silica bwoc, 0.5% of HALAD® 344 fluid loss additive bwoc, 0.73% of a set retarder composition of the present invention bwoc, Texas Lehigh Class H cement, and sufficient water to provide a 16.9 ppg slurry. The components of the set retarder composition were preblended and the set retarder composition was set aside for about 1 week prior to sample preparation. The set retarder composition of the present invention comprised 47.5% of an acrylamide polymer derivative (SCR-100™) by weight, and 47.5% of Universal Cement Systems™ multi-purpose cement additive by weight, and 5% zeolite by weight. Accordingly, the sample composition comprised 0.35% of the acrylamide polymer derivative (SCR-100™) bwoc, 0.35% of Universal Cement Systems™ multi-purpose cement additive bwoc, and 0.03% zeolite bwoc. The zero-gel time was found to be 68 minutes and the transition time was found to be 14 minutes.

A summary of the data from each of the samples is depicted in Table 5, below.

TABLE 5

| FLUID | % SCR-100 ™ | % Universal Cement Systems ™ | % Zeolite | Zero-gel time (min) | Transition Time (min) |
|---|---|---|---|---|---|
| Sample Composition No. 12 | 0.5 | 0 | 0 | 46 | 30 |
| Sample Composition No. 13 | 0.35 | 0.35 | 0.03 | 68 | 14 |

Thus, Example 3 demonstrates, inter alia, that the use of a set retarder composition of the present invention comprised of a reduced dose of an acrylamide polymer derivative provides accelerated transition times and increased zero-gel times when compared to a larger dose of the acrylamide polymer derivative.

EXAMPLE 4

Sample compositions were prepared according to the following procedure. Each sample was dry blended, then mixed for 35 seconds at 15,000 rpm in a Waring blender. After sample preparation, compressive strength tests and thickening time tests were performed on each of the samples using an ultrasonic cement analyzer according to API Specification 10A, Twenty-Third Edition, April 2002. Furthermore, the time for each of the samples to reach a compressive strength of 50 psi and 500 psi, respectively, was recorded. Each sample composition was brought up to 220° F. and 3,000 psi in 60 minutes. Next, the sample compositions were brought up to 250° F. in 240 minutes while static. Thickening time tests were performed at 220° F.

Sample Composition No. 14 (comparative) was prepared by mixing 35% crystalline or non-crystalline silica bwoc, 1% of bentonite bwoc, 0.35% of an acrylamide polymer derivative (SCR-100™), Texas Lehigh Class H cement, and sufficient water to provide a 16.9 ppg slurry. The thickening time was found to be 4 hours and 30 minutes at 220° F.

Sample Composition No. 15 (comparative) was prepared by mixing 35% crystalline or non-crystalline silica bwoc, 1% of bentonite bwoc, 0.50% of an acrylamide polymer derivative (SCR-100™), Texas Lehigh Class H cement, and sufficient water to provide a 16.9 ppg slurry. The thickening time was found to be 4 hours and 35 minutes at 220° F.

Sample Composition No. 16 was prepared by mixing 35% crystalline or non-crystalline silica bwoc, 1% of bentonite bwoc, 0.73% of a set retarder composition of the present invention bwoc, Texas Lehigh Class H cement, and sufficient water to provide a 16.9 ppg slurry. The components of the set retarder composition were preblended and the set retarder composition was set aside for about 1 week prior to sample preparation. The set retarder composition of the present invention comprised 47.5% of an acrylamide polymer derivative (SCR-100™) by weight, 47.5% of Universal Cement Systems™ multi-purpose cement additive by weight, and 5% zeolite by weight. Accordingly, the sample composition comprised 0.35% of the acrylamide polymer derivative (SCR-100™) bwoc, 0.35% of Universal Cement Systems™ multi-purpose cement additive bwoc, and 0.03% zeolite bwoc. The thickening time was found to be 5 hours and 33 minutes at 220° F.

A summary of the thickening times for each of the samples is depicted below in Table 6.

TABLE 6

| FLUID | % SCR-100 ™ | % Universal Cement Systems ™ | Thickening Time at 220° F. (hr:min) |
|---|---|---|---|
| Sample Composition No. 14 | 0.35 | 0 | 4:30 |
| Sample Composition No. 15 | 0.5 | 0 | 4:35 |
| Sample Composition No. 16 | 0.35 | 0.35 | 5:33 |

A summary of the compressive strengths for each of the samples is depicted below in Table 7.

Therefore, Example 4 indicates, inter alia, that the use of a set retarder composition of the present invention comprised of a reduced dose of an acrylamide polymer derivative delivers cement set retardation comparable to a larger dose of the acrylamide polymer derivative.

Therefore, the present invention is well-adapted to carry out the objects and attain the ends and advantages mentioned as well as those which are inherent therein. While the invention has been depicted and described by reference to exemplary embodiments of the invention, such a reference does not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects. The terms in the claims have their plain, ordinary meaning unless otherwise explicitly and clearly defined by the patentee.

What is claimed is:

1. A cement composition comprising:
    a hydraulic cement,
    water, and
    a set retarder composition, the set retarder composition comprising:
        an acrylamide polymer derivative, and
        a soluble iron compound present in an amount sufficient to retard setting of the cement composition.

2. The cement composition of claim 1 wherein the acrylamide polymer derivative comprises monomers formed from 2-acrylamido-2-methylpropane sulfonic acid or a derivative thereof.

3. The cement composition of claim 1 wherein the acrylamide polymer derivative comprises a copolymer comprising a first monomers formed from a hydrolyzed acrylamide, a partially hydrolyzed acrylamide, a hydrolyzed acrylamide derivative, or a partially hydrolyzed acrylamide derivative and a second monomer formed from 2-acrylamido-2-methylpropane sulfonic acid or a derivative thereof.

TABLE 7

| FLUID | % SCR-100 ™ | % Universal Cement Systems ™ | Time for 50 psi Compressive Strength at 250° F. (hr:min) | Time for 500 psi Compressive Strength at 250° F. (hr:min) | 12 Hour Compressive Strength at 250° F. (psi) | 24 Hour Compressive Strength at 250° F. (psi) |
|---|---|---|---|---|---|---|
| Sample Composition No. 14 | 0.35 | 0 | 4:50 | 5:20 | 2447 | 3485 |
| Sample Composition No. 15 | 0.5 | 0 | 5:03 | 5:41 | 2500 | 3625 |
| Sample Composition No. 15 | 0.35 | 0.35 | 5:00 | 5:35 | 2545 | 3509 |

4. The cement composition of claim 1 wherein the acrylamide polymer derivative comprises a copolymer comprising a first monomers formed from acrylic acid and second monomers formed from 2-acrylamido-2-methylpropane sulfonic acid or a derivative thereof.

5. The cement composition of claim 1 wherein the acrylamide polymer derivative comprises a copolymer comprising a first monomers formed from a first acid and second monomers formed from 2-acrylamido-2-methylpropane sulfonic acid or a derivative thereof, wherein the first acid is represented by the formula:

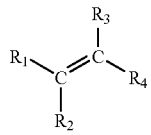

wherein $R_1$ is H or $CH_3$, $R_2$ is H or COOH, $R_3$ is H or COOH, and $R_4$ is H, COOH, or $CH_2COOH$; provided that when $R_1$ is H and $R_2$ is COOH, $R_3$ and $R_4$ are different and are either H or COOH; when $R_1$ and $R_2$ are both H, $R_3$ is COOH and $R_4$ is $CH_2COOH$; and when $R_1$ is $CH_3$, $R_2$ is COOH and $R_3$ and $R_4$ are different and are either H or COOH.

6. The cement composition of claim 1 wherein the soluble iron compound is present in the set retarder composition in an amount in the range of from about 5 percent to about 25 percent by weight.

7. The cement composition of claim 1 wherein the set retarder composition is present in the cement composition in an amount in the range of from about 0.01 percent by weight of the cement to about 5 percent by weight of the cement.

8. A cement composition comprising:
a hydraulic cement;
water; and
a set retarder composition, the set retarder composition comprising:
an acrylamide polymer derivative, and
a soluble iron compound present in the set retarder composition in an amount in the range of from about 5 percent to about 25 percent by weight.

9. The cement composition of claim 8 wherein the acrylamide polymer derivative comprises a monomer formed from 2-acrylamido-2-methylpropane sulfonic acid or a derivative thereof.

10. The cement composition of claim 8 wherein the acrylamide polymer derivative comprises a copolymer comprising a first monomer formed from a hydrolyzed acrylamide, a partially hydrolyzed acrylamide, a hydrolyzed acrylamide derivative, or a partially hydrolyzed acrylamide derivative and a second monomer formed from 2-acrylamido-2-methylpropane sulfonic acid or a derivative thereof.

11. The cement composition of claim 8 wherein the acrylamide polymer derivative comprises a copolymer comprising a first monomer formed from acrylic acid and a second monomer formed from 2-acrylamido-2-methylpropane sulfonic acid or a derivative thereof.

12. The cement composition of claim 8 wherein the acrylamide polymer derivative comprises a copolymer comprising a first monomer formed from a first acid and a second monomer formed from 2-acrylamido-2-methylpropane sulfonic acid or a derivative thereof, wherein the first acid is represented by the formula:

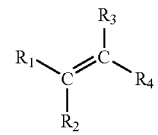

wherein $R_1$ is H or $CH_3$, $R_2$ is H or COOH, $R_3$ is H or COOH, and $R_4$ is H, COOH, or $CH_2COOH$; provided that when $R_1$ is H and $R_2$ is COOH, $R_3$ and $R_4$ are different and are either H or COOH; when $R_1$ and $R_2$ are both H, $R_3$ is COOH and $R_4$ is $CH_2COOH$; and when $R_1$ is $CH_3$, $R_2$ is COOH and $R_3$ and $R_4$ are different and are either H or COOH.

13. The cement composition of claim 8 wherein the set retarder composition is present in the cement composition in an amount in the range of from about 0.01 percent by weight of the cement to about 5 percent by weight of the cement.

14. A cement composition comprising:
a hydraulic cement;
water; and
a set retarder composition, the set retarder composition comprising:
a soluble iron compound present in an amount sufficient to retard setting of the cement composition, and
a second component selected from the group consisting of: an acrylamide polymer derivative and a lignin-based retarder.

15. The set retarder composition of claim 14 wherein the second component is an acrylamide polymer derivative comprising a monomer formed from 2-acrylamido-2-methylpropane sulfonic acid or a derivative thereof.

16. The set retarder composition of claim 14 wherein the second component is an acrylamide polymer derivative comprising a first monomer formed from a hydrolyzed acrylamide, a partially hydrolyzed acrylamide, a hydrolyzed acrylamide derivative, or a partially hydrolyzed acrylamide derivative and a second monomer formed from 2-acrylamido-2-methylpropane sulfonic acid or a derivative thereof.

17. The set retarder composition of claim 14 wherein the second component is an acrylamide polymer derivative comprising a copolymer comprising a first monomer formed from acrylic acid and a second monomer formed from 2-acrylamido-2-methylpropane sulfonic acid or a derivative thereof.

18. The set retarder composition of claim 14 wherein the second component is an acrylamide polymer derivative comprising a copolymer comprising a first monomer formed from a first acid and a second monomer formed from 2-acrylamido-2-methylpropane sulfonic acid or a derivative thereof, wherein the first acid is represented by the formula:

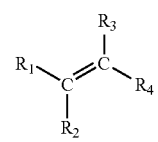

wherein $R_1$ is H or $CH_3$, $R_2$ is H or COOH, $R_3$ is H or COOH, and $R_4$ is H, COOH, or $CH_2COOH$; provided that when $R_1$ is H and $R_2$ is COOH, $R_3$ and $R_4$ are different and are either H or COOH; when $R_1$ and $R_2$ are both H, $R_3$ is COOH and $R_4$ is $CH_2COOH$; and when $R_1$ is $CH_3$, $R_2$ is COOH and $R_3$ and $R_4$ are different and are either H or COOH.

19. The set retarder composition of claim 14 wherein the second component is an acrylamide polymer derivative comprising present in the set retarder composition in an amount in the range of from about 1 percent to about 95 percent by weight.

20. The cement composition of claim 14 wherein the second component is a lignin-based retarder comprising a lignosulfonate and a sulfonated lignin.

21. The cement composition of claim 14 wherein the second component is a lignin-based retarder further comprising a sugar acid.

22. The cement composition of claim 14 wherein the second component is a lignin-based retarder present in the set retarder composition in an amount in the range of from about 30 percent to about 60 percent by weight.

23. The cement composition of claim 14 wherein the soluble iron compound is present in the set retarder composition in an amount in the range of from about 5 percent to about 25 percent by weight.

24. The cement composition of claim 14 wherein the set retarder composition is present in the cement composition in an amount in the range of from about 0.01 percent by weight of the cement to about 5 percent by weight of the cement.

* * * * *